(12) United States Patent
Sun et al.

(10) Patent No.: US 7,758,986 B2
(45) Date of Patent: Jul. 20, 2010

(54) PROTON CONDUCTOR, POLYMER ELECTROLYTE COMPRISING THE SAME AND FUEL CELL EMPLOYING THE POLYMER ELECTROLYTE

(75) Inventors: Hee-young Sun, Yongin-si (KR); Myung-dong Cho, Hwaseong-si (KR); Myung-jin Lee, Yongin-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1218 days.

(21) Appl. No.: 11/311,690

(22) Filed: Dec. 20, 2005

(65) Prior Publication Data

US 2006/0141317 A1 Jun. 29, 2006

(30) Foreign Application Priority Data

Dec. 24, 2004 (KR) .................. 10-2004-0112237

(51) Int. Cl.
*H01M 8/10* (2006.01)
(52) U.S. Cl. .................... 429/33; 429/30; 429/317; 521/27; 521/25; 521/28
(58) Field of Classification Search .................. 429/33, 429/30, 317; 521/27, 25, 28
See application file for complete search history.

(56) References Cited

U.S. PATENT DOCUMENTS

| 6,395,429 | B1 | 5/2002 | Kang et al. |
| 2004/0062972 | A1 | 4/2004 | Hara et al. |

FOREIGN PATENT DOCUMENTS

| EP | 0306802 | 3/1989 |
| JP | 07-065624 | 3/1995 |
| JP | 2000-090946 | 3/2000 |
| JP | 2001-307545 | 11/2001 |
| JP | 2003-100348 | 4/2003 |
| JP | 2003-257451 | 9/2003 |
| JP | 2004-190002 | 7/2004 |
| JP | 2004-199879 | 7/2004 |
| JP | 2004-235071 | 8/2004 |
| WO | 9954129 | 10/1999 |
| WO | 0129291 | 4/2001 |
| WO | 0163683 | 8/2001 |

OTHER PUBLICATIONS

Andrei et al. "Polymer electrolytes based on poly-phosphazene with pendant 12-crown-4 groups and monovalent salts", Electrochimica Acta (1992, 37 (9), 1545-9.*
Ritchie et al. "A sol-gel synthesis of polyether-based proton conducting electrolytes", Analytica Chimica Acta (2003), 496 (1-2), 65-71.*
European Search Report dated Nov. 3, 2008.
Rene Plehnert, et al.; Synthesis and Thermotropic Liquid Crystalline Properties of Calamitic Molecules with Laterally Attached Hydrophilic Groups: Y-Shaped Three-Block Molecules Which Can Form Smectic and Columnar Mesophases; J. Mater. Chem., 1998, 8, 2611-2626; pp. 2611-2622.

* cited by examiner

*Primary Examiner*—Laura S Weiner
(74) *Attorney, Agent, or Firm*—H.C. Park & Associates, PLC

(57) ABSTRACT

A proton conductor includes a molecule with a hydroxy group arranged at a terminal end and an ether-based functional group arranged at an α-carbon position. The proton conductor may be used to impregnate a polymer matrix to form a polymer electrolyte.

14 Claims, 4 Drawing Sheets

PROTON CONDUCTOR, POLYMER ELECTROLYTE COMPRISING THE SAME AND FUEL CELL EMPLOYING THE POLYMER ELECTROLYTE

CROSS REFERENCE TO RELATED APPLICATIONS

This application claims priority to and the benefit of Korean Patent Application No. 10-2004-0112237, filed on Dec. 24, 2004, which is hereby incorporated by reference for all purposes as if fully set forth herein.

BACKGROUND OF THE INVENTION

1. Field of the Invention

The present invention relates to a proton conductor, a polymer electrolyte including the same, and a fuel cell employing the polymer electrolyte, and more particularly, to a proton conductor having sufficient ionic conductivity at high temperatures and no humidity, a polymer electrolyte including the same, and a fuel cell employing the polymer electrolyte.

2. Discussion of the Related Art

Fuel cells may be classified according to their electrolyte type. Types of fuel cells include polymer electrolyte membrane fuel cells (PEMFCs), phosphoric acid fuel cells (PAFCs), molten carbonate fuel cells (MCFCs), solid oxide fuel cells (SOFCs), and others. The working temperatures of the fuel cells and their constituent materials vary depending on the electrolyte type.

The basic PEMFC may include an anode (fuel electrode), a cathode (oxidizing agent electrode), and a polymer electrolyte membrane interposed between the anode and the cathode. The anode may include a catalyst layer to promote the oxidation of a fuel. The cathode may include a catalyst layer to promote the reduction of an oxidizing agent.

The fuel supplied to the anode may be hydrogen, a hydrogen-containing gas, a mixture of methanol vapor and water vapor, an aqueous methanol solution, or the like. The oxidizing agent supplied to the cathode may be oxygen, an oxygen-containing gas, air, or the like.

Fuel is oxidized to produce protons and electrons at the anode of the PEMFC. The protons migrate to the cathode through an electrolyte membrane and the electrons migrate to an external circuit (load) through a conductive wire (or current collector). The electrons are supplied to the cathode from the external circuit through another conductive wire (or current collector). At the cathode of the PEMFC, the migrated protons react with the electrons and oxygen to produce water. The migration of electrons from the anode to the cathode via the external circuit generates electric power.

In a PEMFC, the polymer electrolyte membrane acts as an ionic conductor for the migration of protons from the anode to the cathode and also acts as a separator to prevent contact between the anode and the cathode. The polymer electrolyte membrane therefore requires sufficient ionic conductivity, electrochemical safety, high mechanical strength, thermal stability at its operating temperature, and should be easily formed into thin layers.

Polymer electrolyte membranes may include a sulfonated perfluorinated polymer with fluorinated alkylene in the backbone and fluorinated vinylether side chains with sulfonic acid at its terminal, such as NAFION, manufactured by DUPONT.

This type of polymer electrolyte membrane may experience a lowered ionic conductivity at operating temperatures of 100° C. or higher due to the loss of moisture by evaporation. It is therefore difficult to operate a PEMFC using this type of polymer electrolyte membrane under atmospheric pressure at about 100° C. or higher. PEMFCs have been operated at 100° C. or lower, for example, at about 80° C.

Methods used to raise the operating temperature of the PEMFC to about 100° C. or higher include a method of providing the PEMFC with a humidification apparatus, a method of operating the PEMFC under pressurize, and a method of using a polymer electrolyte without humidification.

However, when a PEMFC is operated under pressure, the boiling point of water increases, which raises the operating temperature. Furthermore, the use of a pressurizing system or humidification apparatus increases the size and weight of the PEMFC and reduces the overall efficiency of the power generating system. Therefore, a polymer electrolyte membrane with sufficient ionic conductivity at low or no humidity is needed to broaden the range of utilization of the PEMFC.

In conventional fuel cells, water or H3PO4 may be used as the proton conductors. However, when water is used as a proton conductor at high temperatures and no humidity, evaporation may cause a loss of ionic conducting property. When H3PO4 is used as the proton conductor, H3PO4 anions may be adsorbed on the surface of a catalyst, such as Pt, and may deteriorate the performance of the MEA.

SUMMARY OF THE INVENTION

This invention provides a proton conductor that includes a molecule with a hydroxy group arranged at a terminal end and an ether-based functional group arranged at an $\alpha$-carbon position. The proton conductor may be used to impregnate a polymer matrix to provide a polymer electrolyte. The proton conductor may maintain its proton conducting property even at temperatures of about 100° C. or higher and does not generate anions.

This invention also provides a method of preparing the proton conductor, and a membrane electrode assembly (MEA) and a fuel cell that include the proton conductor.

Additional features of the invention will be set forth in the description which follows, and in part will be apparent from the description, or may be learned by practice of the invention.

The present invention discloses a proton conductor that includes a molecule with a hydroxy group arranged at a terminal end and an ether-based functional group arranged at an $\alpha$-carbon position.

The present invention also discloses a polymer electrolyte including a proton conductor that includes a molecule with a hydroxy group arranged at a terminal end and an ether-based functional group arranged at an $\alpha$-carbon position and a conducting polymer matrix.

The present invention also discloses a method of preparing a polymer electrolyte including pretreating a polymer matrix and impregnating the polymer matrix with a proton conductor, where the proton conductor comprises a molecule with a hydroxy group arranged at a terminal end and an ether-based functional group arranged at an $\alpha$-carbon position into the pretreated polymer matrix to obtain the polymer electrolyte.

The present invention also discloses a fuel cell including a cathode, an anode, and the polymer electrolyte described above interposed between the cathode and the anode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
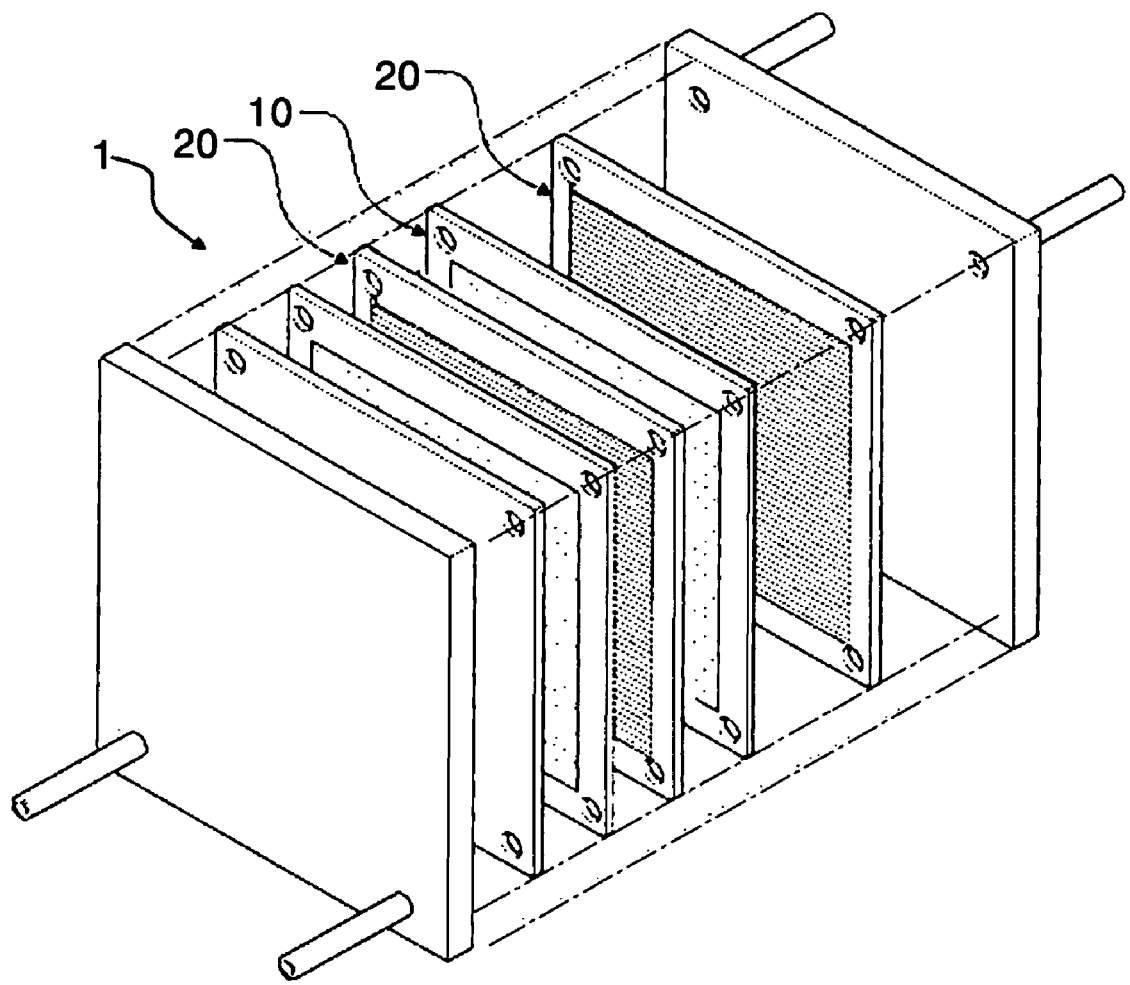
FIG. 1 is an exploded perspective view of a fuel cell stack according to an exemplary embodiment of the present invention.
Figure 2:
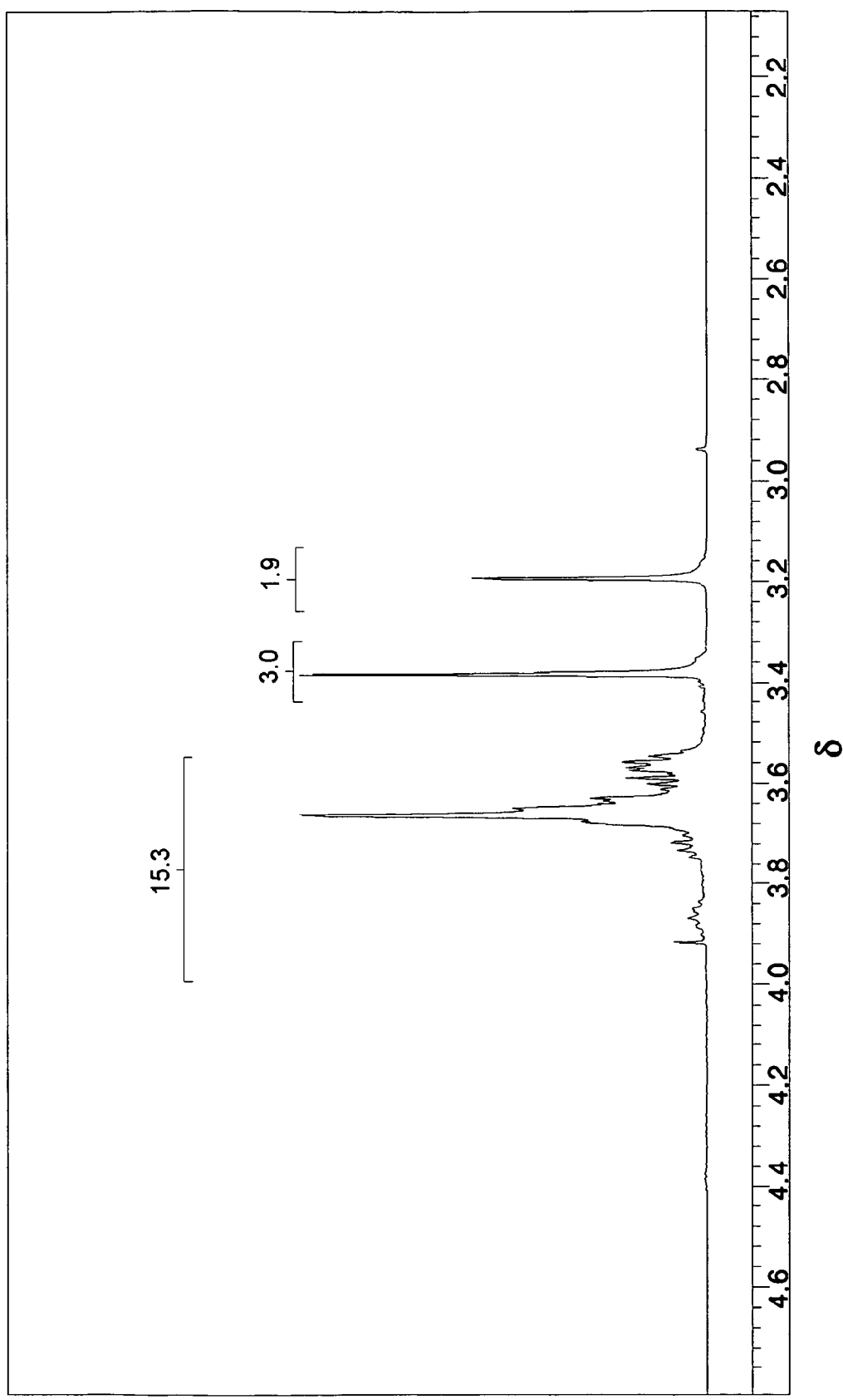
FIG. 2 is the nuclear magnetic resonance (NMR) spectrum of a compound represented by Formula (1) obtained in Synthesis Example 1.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present.

In an exemplary embodiment of the present invention, a polymer electrolyte may include NAFION or a polymer matrix containing a sulfonyl group as a polymer matrix, and a compound having a high boiling point and a terminal group capable of forming hydrogen bonds, such as a hydroxy group, as a proton conductor.

The proton conductor may have a hydroxy group at a terminal end and an ether-based functional group at an α-carbon position. The proton conductor may include compounds that have a hydroxy group at a terminal to form hydrogen bonds and have a boiling is point of about 300° C. or higher, preferably about 300 to about 400° C.

Examples of the compound having the structure described above include 4,7,10,13-tetraoxatetradecane-1,2-diol (TOTD-diol), represented by Formula (1), 1,4-anhydroerythritol, represented by Formula (2), 2-hydroxymethyl-12-crown-4, represented by Formula (3), glycerol formal, represented by Formula (4), and poly(ethylene glycol) methyl ether represented by Formula (5):

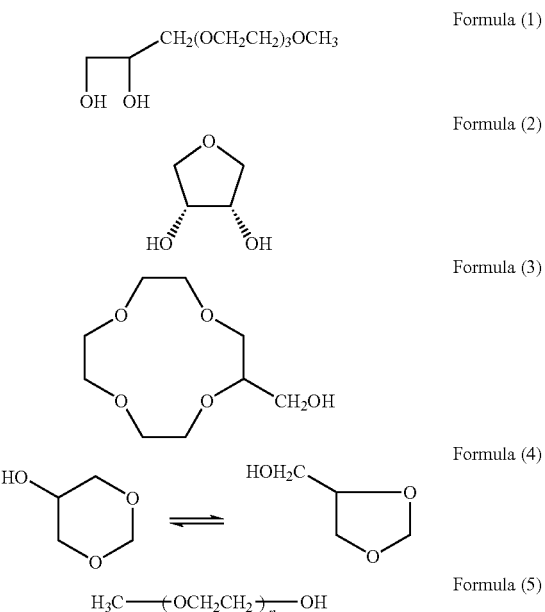

where n is a number of 1 to 10.

The boiling point of the compound represented by Formula (1) is 300° C. The flash point of the compound represented by Formula (2) is 230° F. The boiling point of the compound represented by Formula (3) is 115° C./0.04 mmHg. The boiling point of the compound represented by Formula (4) is 192 to 193° C. The vapor pressure of the compound represented by Formula (5) is 0.05 mmHg (20° C.).

The number average molecular weight of the poly(ethylene glycol) methyl ether may be about 100 to about 1000, particularly about 350.

TOTD-diol represented by Formula (1) has a strong intermolecular force due to hydrogen bonding, and thus is stable at higher temperatures and low atmospheric pressure.

A method of preparing a polymer electrolyte according to an embodiment of the present invention will now be described in more detail.

First, a polymer matrix may be pretreated using a process for removing impurities in a conducting polymer membrane and activating a cation exchange site. The pretreatment may be carried out, for example, by washing the conducting polymer membrane with $H_2O_2$, immersing the washed conducting polymer membrane in diluted aqueous $H_2SO_4$ solution for a predetermined time, washing the resultant with deionized water, and drying the resultant.

NAFION or a polymer membrane having a sulfonyl group or phosphoryl group may be used as the polymer matrix. NAFION is a perfluorocarbon sulfonic acid cation exchange resin. Polysulfone, perfluorocarboxylic acid, styrene-vinyl benzene sulfonic acid, or the like may be used as the polymer matrix. An $SO_3H$ group of the polymer matrix may be used as a proton source.

The pretreated polymer matrix may be immersed in a proton conductor, such as TOTD-diol represented by Formula (1), to obtain a polymer electrolyte with the proton conductor impregnated into the polymer matrix.

The proton conductor may be heated to about 70 to about 90° C. before impregnating the proton conductor into the polymer matrix. The heating step allows for a reduction in the impregnation time, more uniform impregnation, and an increase in the amount of the proton conductor impregnated, thereby improving ionic conductivity.

The resulting polymer electrolyte has a structure in which the proton conductor, which may have a hydroxy group at a terminal end and an ether-based functional group at an α-carbon position, is impregnated into the conducting polymer matrix. The amount of the proton conductor may be about 10 to about 300 parts by weight per 100 parts by weight of the polymer matrix. When the amount of the proton conductor is less than about 10 parts by weight per 100 parts by weight of the polymer matrix, the proton conducting property of the membrane may be poor. When the amount of the proton conductor is greater than about 300 parts by weight per 100 parts by weight of the polymer matrix, the mechanical strength of the membrane may be poor.

The proton conductor of an exemplary embodiment of the present invention may operate by a vehicle mechanism in which protons are solvated by and migrate together in a liquid having excellent mobility, such as water or other solvents, instead of migrating by hopping between functional groups (sulfonyl groups). This mechanism provides an electrolyte with excellent proton conductivity.

The polymer electrolyte of the present embodiment may be used as a polymer electrolyte membrane of a fuel cell and may be interposed between a cathode and an anode to form an MEA.

The cathode and anode may include a gas diffusion layer and a catalyst layer. The catalyst layer may include a metal catalyst to promote the oxidation of hydrogen and the reduction of oxygen. The catalyst layer may include at least one catalyst such as Pt, Ru, Os, a Pt—Ru alloy, a Pt—Os alloy, a Pt—Pd alloy or a Pt-M alloy where M is at least one transition metal selected from the group of Ga, Ti, V, Cr, Mn, Fe, Co, Ni, Cu and Zn. More preferably, the catalyst layer includes at least one catalyst selected from the group of Pt, Ru, Os, a Pt—Ru alloy, a Pt—Os alloy, a Pt—Pd alloy, a Pt—Co alloy and a Pt—Ni alloy.

The metal catalyst may be arranged on a support. The support may be carbon, such as acetylene black or graphite, or inorganic particulates, such as alumina or silica. A commercially available supported noble metal catalyst may be used, or a supported metal catalyst may be prepared by impregnating the support with the noble metal.

The gas diffusion layer may be made of a carbon paper or carbon cloth. The gas diffusion layer may support an electrode of a fuel cell and may diffuse a reaction gas into the catalyst layer. The gas diffusion layer may be made of a carbon paper or carbon cloth treated with a fluorine-based resin such as polytetrafluoroethylene to prevent reducing the gas diffusion efficiency due to water produced during the operation of the fuel cell.

The electrodes may include a microporous layer between the gas diffusion layer and the catalyst layer to further enhance the gas diffusion effect. The microporous layer may be formed by applying a composition to the gas diffusion layer or catalyst layer. The composition may include a conducting material, such as carbon powder, carbon black, activated carbon, or acetylene black, a binder, such as polytetrafluoroethylene, and, if necessary, an ionomer.

A fuel cell according to another exemplary embodiment of the present invention may include an MEA that includes electrodes arranged at both sides of the polymer electrolyte membrane, at least one electricity generation system that includes separators arranged at both sides of the MEA and generates electricity through the electrochemical reaction of hydrogen and oxygen, a fuel supply system that supplies a hydrogen containing fuel to the electricity generation system, and an oxygen supply system that supplies oxygen to the electricity generation system.

Separators may be disposed at both sides of the MEA to form at least one electricity generation system by supplying fuel and oxygen to the catalyst layer to generate electricity through the electrochemical reaction of hydrogen and oxygen. The electricity generation system may be in the form of a stack.

FIG. 1 is an exploded perspective view of such a stack. Referring to FIG. 1, a stack 1 may include a MEA 10 including the polymer electrolyte membrane of the present invention and separators 20 arranged at both sides of the MEA 10.

The electricity generation system may include the polymer electrolyte membrane, electrodes arranged at both sides of the polymer electrolyte membrane, and bipolar plates. The electricity generation system generates electricity through the reaction of hydrogen and oxygen.

The fuel supply system may supply a hydrogen-containing fuel to the electricity generation system and the oxygen supply system may supply oxygen to the electricity generation system.

The fuel cell of the present invention may be a phosphoric acid fuel cell (PAFC), a polymer electrolyte membrane fuel cell (PEMFC), or an alkaline fuel cell.

The present invention will now be described in greater detail with reference to the following examples. The following examples are for illustrative purposes only and are not intended to limit the scope of the invention.

Synthesis Example 1

Preparation of Compound Represented by Formula (1)

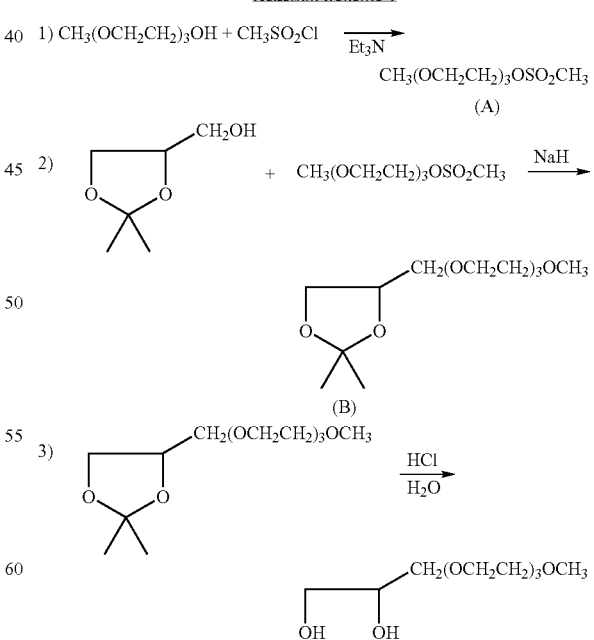

1) Synthesis of Compound (A)

65 g of triethyleneglycol monoethyl ether and 42 g of methane sulfonyl chloride were dissolved in 400 ml of THF in an ice bath, and then 52 g of triethylamine was added thereto and reacted for 24 hours. Once the reaction was completed, the product was dissolved in 300 ml of chloroform and washed with a small amount of a saturated NaCl solution. The resultant was separated into an aqueous layer and an organic layer. The solvent of the organic layer solvent was removed with an evaporator to obtain 59 g of a pale yellow liquid, which was labeled as Compound (A).

2) Synthesis of Compound (B)

36 g of Solketal and 6.7 g of NaH were dissolved in 400 ml of 1,4-dioxane, and then 58 g of Compound (A) obtained above was slowly added thereto and reacted for 18 hours. The resulting salt was removed and the solvent was evaporated. Then, the resulting product was fractional distilled under a vacuum to obtain 32 g of Compound (B) in a colorless liquid state.

3) Synthesis of Compound (C)

31 g of the Compound (B) and 10 ml of a saturated HCl aqueous solution were dissolved in 100 ml of THF and stirred for 18 hours. The reaction mixture was neutralized with a diluted NaOH solution to have a pH of about 5 to 6. Then, the resulting product was fractional distilled under a vacuum to obtain 19 g of a colorless compound represented by Formula (1).

The structure of the obtained compound was identified through the NMR spectrum of FIG. 1.

Reference Example 1

Comparison of the Impregnated Amount of Proton Conductor

NAFION 117 (available from DUPONT) was cut to a proper size and washed with a 3 vol % $H_2O_2$ aqueous solution at 80° C. for 1 hr. The NAFION 117 was immersed in a 0.5 M $H_2SO_4$ solution at 80° C. for 1 hour to substitute a Na ion of a functional group (—SO3Na) of the Nafion 117 with a proton.

The substituted Nafion 117 was washed with distilled water, dried at 105° C. for 3 hrs, and stored in a dry room.

The obtained NAFION 117 films were placed into a container containing either TOTD-diol represented by Formula (1), deionized water, or $H_3PO_4$. The NAFION 117 films were immersed in their respective proton conductors for 1 hour at 60° C. to impregnate the NAFION 117 films and obtain polymer electrolytes. The amount of the proton conductors impregnated in the polymer electrolyte was determined by weighing the polymer electrolytes and the results are illustrated in FIG. 3.

Figure 3:
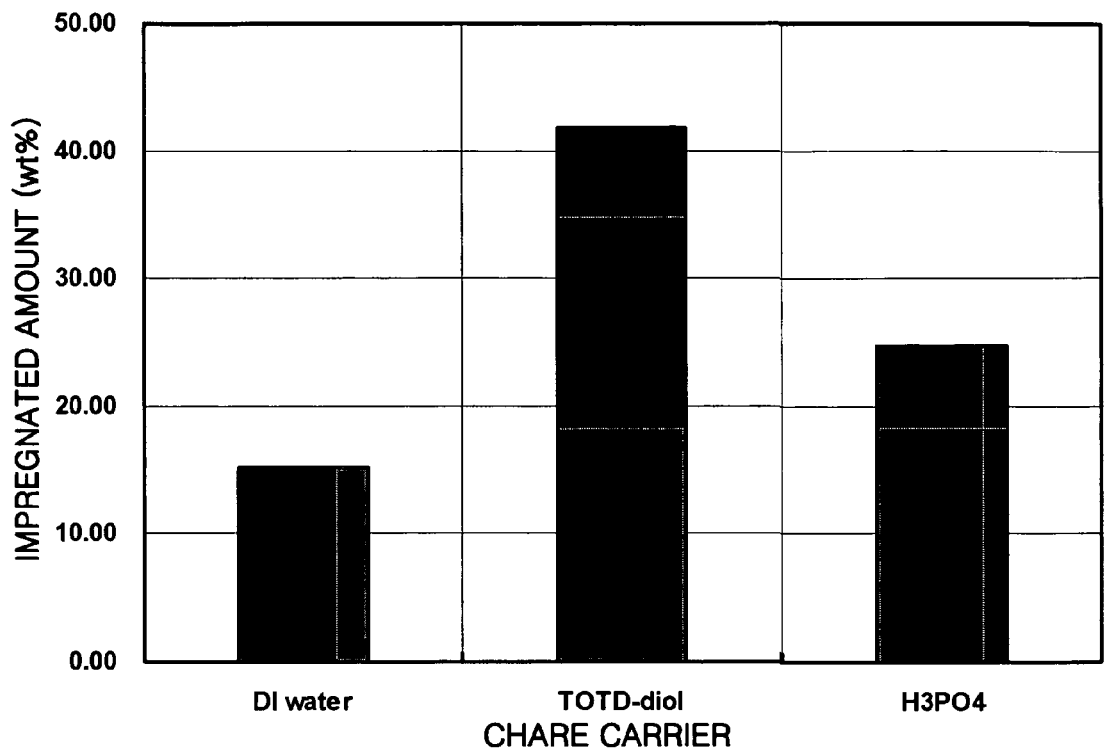
FIG. 3 illustrates the impregnated amount of a proton conductor in a polymer electrolyte obtained in Reference Example 1.

Referring to FIG. 3, a larger weight percent of TOTD-diol was impregnated in the NAFION 117 film than the weight percent of the other proton conductors. However, the mole fraction of water impregnated was roughly 3 times greater than that of TOTD-diol.

Example 1

Preparation of Polymer Electrolyte and Fuel Cell

NAFION 117 (available from Dupont) was cut to a proper size and washed with a 3 vol % $H_2O_2$ solution at 80° C. for 1 hour. The NAFION 117 was immersed in a 0.5 M $H_2SO_4$ solution at 80° C. for 1 hour to substitute a Na ion of a functional group (—SO3Na) of the Nafion 117 with a proton.

The substituted Nafion 117 was washed with distilled water. The washed film was dried at 105° C. for 3 hrs and stored in a dry room.

A container containing TOTD-diol represented by Formula (1) was heated at 80° C. for 1 hr. Next, the Nafion 117 film obtained above was immersed in the TOTD-diol to impregnate the NAFION 117 and obtain a polymer electrolyte.

A MEA was fabricated using a 99.99% Pt plate as an electrode and the polymer electrolyte. A fuel cell was fabricated using the MEA.

Comparative Example 1

A polymer electrolyte membrane, an MEA using the polymer electrolyte membrane, and a fuel cell using the MEA were fabricated in the same manner as in Example 1, except that water was substituted for TOTD-diol represented by Formula (1).

Comparative Example 2

A polymer electrolyte membrane, an MEA using the polymer electrolyte membrane, and a fuel cell using the MEA were fabricated in the same manner as in Example 1, except that an 85% $H_3PO_4$ aqueous solution was substituted for TOTD-diol represented by Formula (1).

Figure 4:
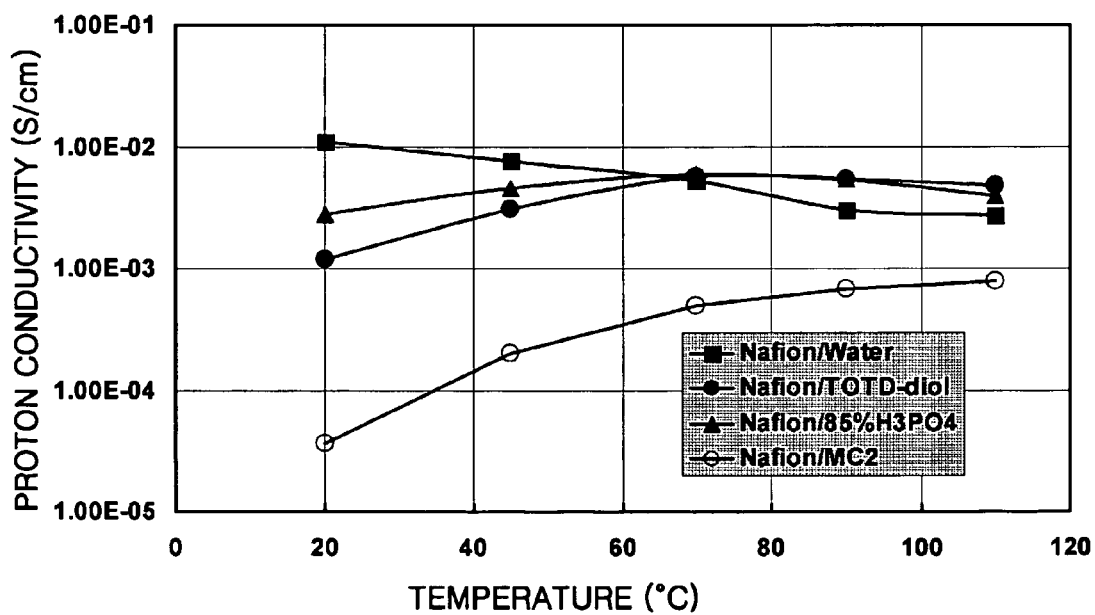
FIG. 4 illustrates the proton conductivity of polymer electrolyte membranes prepared in Example 1, Comparative Example 1, and Comparative Example 2, measured in atmospheric air with no humidity while raising the temperature from 20° C. to 110° C.

The proton conductivities of the polymer electrolyte membranes prepared in Example 1 and Comparative Examples 1 and 2 were measured at about 0% relative humidity in atmospheric air while raising the temperature from 20 to 120° C. and the results are illustrated in FIG. 4.

Referring to FIG. 4, at lower temperatures, the NAFION impregnated with water has the highest proton conductivity, but its proton conductivity decreases with temperature, which indicates its instability at higher temperatures.

The Nafion impregnated with TOTD-diol has a proton conductivity that increases with temperature and at temperatures of about 70° C. or higher, its proton conductivity is higher than that of the NAFION impregnated with water. These results indicate that TOTD-diol has sufficient proton conducting properties and thermal stability.

The proton conductivity of the polymer electrolyte membranes prepared in Example 1 and Comparative Examples 1 and 2 were measured at no humidity and 110° C. in atmospheric air. The results are illustrated in FIG. 5.

Figure 5:
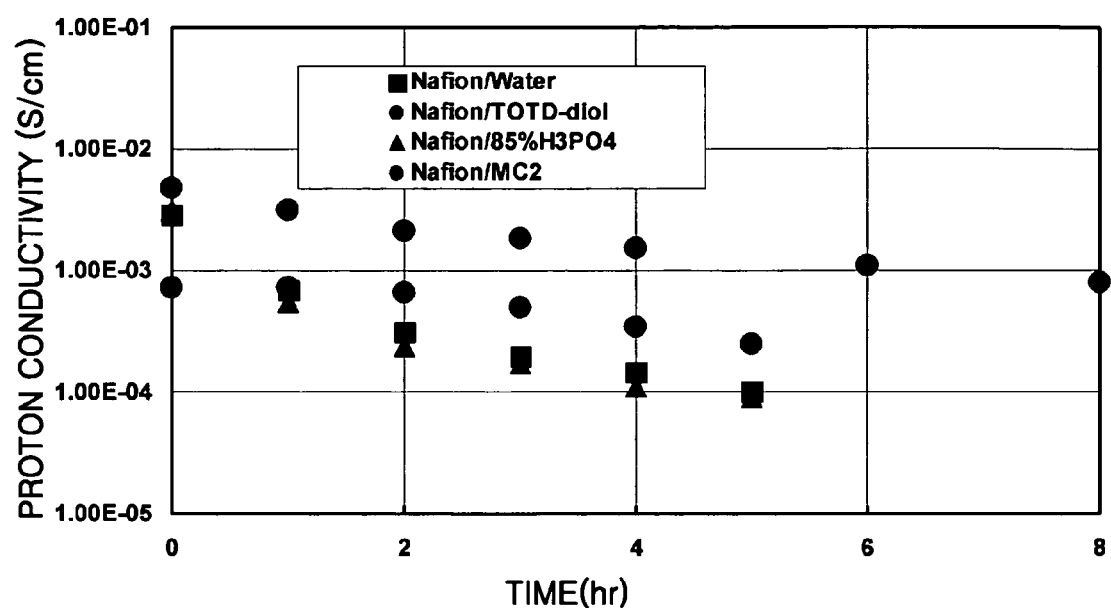
FIG. 5 illustrates the proton conductivity of polymer electrolyte membranes prepared in Example 1, Comparative Example 1, and Comparative Example 2, measured over time under atmospheric air with no humidity at 110° C.

Referring to FIG. 5, water and $H_3PO_4$ lose their proton conducting properties due to evaporation at higher temperatures, whereas TOTD-diol has superior stability and proton conducting properties at higher temperatures.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A proton conductor, comprising:
a molecule with a hydroxy group arranged at a terminal end and an ether-based functional group arranged at an α-carbon position,
wherein the molecule is 4,7,10,13-tetraoxatetradecane-1,2-diol.

2. The proton conductor of claim 1,
wherein the proton conductor has a boiling point of about 300° C. or higher.

3. A polymer electrolyte, comprising:
a proton conductor comprising a molecule with a hydroxy group arranged at a terminal end and an ether-based functional group arranged at an α-carbon position; and
a conducting polymer matrix,
wherein the molecule is 4,7,10,13-tetraoxatetradecane-1,2-diol.

4. The polymer electrolyte of claim 3,
wherein the polymer matrix comprises a sulfonated perfluorinated polymer with fluorinated alkylene in the backbone and fluorinated vinylether side chains with sulfonic acid at its terminal.

5. The polymer electrolyte of claim 3,
wherein the amount of the proton conductor is about 10 to about 300 parts by weight per 100 parts by weight of the polymer matrix.

6. A method of preparing a polymer electrolyte, comprising:
pretreating a polymer matrix; and
impregnating the polymer matrix with a proton conductor,
wherein the proton conductor comprises a molecule with a hydroxy group arranged at a terminal end and an ether-based functional group arranged at an α-carbon position wherein the molecule is 4,7,10,13-tetraoxatetradecane-1,2-diol.

7. The method of claim 6,
wherein the polymer matrix comprises a sulfonated perfluorinated polymer with fluorinated alkylene in the backbone and fluorinated vinylether side chains with sulfonic acid at its terminal.

8. The method of claim 6,
wherein the amount of the proton conductor is about 10 to about 300 parts by weight per 100 parts by weight of the polymer matrix.

9. The method of claim 6,
wherein pretreating the polymer matrix comprises,
washing the polymer matrix with an aqueous $H_2O_2$ solution,
immersing the polymer matrix in an aqueous $H_2SO_4$ solution for a predetermined time,
washing the resultant with deionized water, and
drying the resultant.

10. A fuel cell, comprising:
a cathode;
an anode; and
a polymer electrolyte interposed between the cathode and the anode,
wherein the polymer electrolyte comprises,
a proton conductor comprising a molecule with a hydroxy group arranged at a terminal end and an ether-based functional group arranged at an α-carbon position wherein the molecule is 4,7,10,13-tetraoxatetradecane-1,2-diol; and
a conducting polymer matrix.

11. The fuel cell of claim 10,
wherein the polymer matrix comprises a sulfonated perfluorinated polymer with fluorinated alkylene in the backbone and fluorinated vinylether side chains with sulfonic acid at its terminal.

12. The fuel cell of claim 10,
wherein the amount of the proton conductor is about 10 to about 300 parts by weight per 100 parts by weight of the polymer matrix.

13. The fuel cell of claim 10,
wherein at least one of the cathode and the anode comprises a proton conductor comprising a molecule with a hydroxy group arranged at a terminal end and an ether-based functional group arranged at an α-carbon position.

14. The fuel cell of claim 13,
wherein the molecule of the at least one of the cathode and anode is at least one compound selected from the group consisting of 4,7,10,13-tetraoxatetradecane-1,2-diol, 1,4-anhydroerythritol, 2-hydroxymethyl-12-crown-4, glycerol formal and poly(ethylene glycol) methyl ether.

* * * * *